(12) United States Patent
Paumier et al.

(10) Patent No.: US 6,382,277 B1
(45) Date of Patent: May 7, 2002

(54) STUMP GRINDING WHEEL AND CUTTING ASSEMBLIES THEREFOR

(75) Inventors: James Paumier, Canton, OH (US); Kenneth Monyak, Abingdon, VA (US)

(73) Assignee: Sandvik Rock Tools, Inc., Bristol, VA (US)

(*) Notice: Subject to any disclaimer, the term of this patent is extended or adjusted under 35 U.S.C. 154(b) by 0 days.

(21) Appl. No.: 09/837,231

(22) Filed: Apr. 19, 2001

(51) Int. Cl.[7] ............................. B27C 1/00; H01G 23/06
(52) U.S. Cl. .................... 144/235; 144/24.12; 144/241; 144/334; 299/102; 241/294
(58) Field of Search ................. 241/294; 144/24.12, 144/218, 235, 241, 334; 407/33, 34, 46, 101; 299/78, 102; 37/301, 302

(56) References Cited

U.S. PATENT DOCUMENTS

| | | |
|---|---|---|
| 3,570,566 A | 3/1971 | McCreery |
| 3,797,544 A | 3/1974 | Ver Ploeg |
| 3,935,887 A | 2/1976 | Van Zante et al. |
| 4,759,394 A | 7/1988 | Clemenson |
| 4,827,995 A | 5/1989 | Wilson |
| 4,974,649 A | 12/1990 | Manning |
| 5,042,733 A | 8/1991 | Hench |
| 5,135,035 A | 8/1992 | Mills |
| 5,183,089 A | 2/1993 | Norlander et al. |
| 5,279,345 A | 1/1994 | LeMaux et al. |
| 5,365,986 A | 11/1994 | Hooser |
| 5,497,815 A | 3/1996 | Bowling |
| 6,024,143 A | 2/2000 | Ritchey |
| 6,138,725 A | * 10/2000 | Leonardi et al. ........ 144/241 X |

* cited by examiner

Primary Examiner—W. Donald Bray
(74) Attorney, Agent, or Firm—Burns, Doane, Swecker & Mathis, L.L.P.

(57) ABSTRACT

A stump grinding tool includes a rotary cutting wheel having a pair of side surfaces and an outer peripheral surface. Cutting assemblies are mounted on the cutting wheel, each cutting assembly including first and second pockets disposed on respective side surfaces of the wheel. Each pocket includes a leading through-hole and a trailing through-hole aligned with respective leading end trailing through-holes of the other pocket for receiving a pair of cutting teeth. Each tooth extends through aligned through-holes of the pocket and cutting wheel in mutually opposite directions, wherein cutting elements of the teeth are disposed adjacent respective ones of the side surfaces. Each tooth is fixed by a nut threaded thereon such that each tooth and associated nut functions to clamp both of the first and second pockets against the respective side-surfaces of the cutting wheel.

20 Claims, 8 Drawing Sheets

STUMP GRINDING WHEEL AND CUTTING ASSEMBLIES THEREFOR

BACKGROUND OF THE INVENTION

The present invention relates to cutting tools for use in an apparatus for disintegrating material, such as a tree stump grinding machine.

Conventional stump grinders are disclosed in U.S. Pat. Nos. 5,279,345 and 5,497,815 for example. As shown in FIG. 1, a typical tree stump grinding machine comprises a rotatable wheel 1 having a plurality of cutting assemblies mounted thereon. The cutting assemblies are arranged in groups, each group extending in a generally helical pattern relative to the axis of rotation. Each cutting assembly comprises a pair of cutter units 2, 2' disposed on respective sides 8 of the wheel and aligned with one another in a direction parallel to the axis of rotation. The wheel is rotated while adjacent to the stump and the cutter teeth are moved into contact with the stump. As a result, the stump is gradually disintegrated.

A typical cutter unit 2 or 2' comprises a tooth composed of a steel shaft 3 that carries a carbide cutting tip 4. The shaft is attached to the wheel by a steel body 5 known as a "pocket" that is bolted to the wheel. The pockets are usually so large that the relatively smaller cutting tips are unable to cut away enough of the stump to create a space sufficiently large for the pockets to pass through. Also, the distance from the carbide cutting tip to the outside pocket surface 6, as measured in a direction perpendicular to the respective side 8 of the wheel, may be insufficient to allow uncut material (such as small rocks) and cut debris to pass freely rearward past the pocket. This uncut material and cut debris creates friction and drag between the pockets and the stump being worked which robs horsepower from the grinding operation.

The pocket 5 is made thick to provide ample strength, and a front edge 9 of the pocket is vulnerable to impact against rocks which lends to fatigue and finally breaking of both the pockets and the mounting bolts. The edge also adds more frictional resistance to the rotating wheel.

Another problem is that the shank 3 of each cutting tooth extends out from the pocket to support the carbide tip and thus increases the stress on the mounting bolts. The longer the shank, the more radial leverage is exerted on the pocket and bolts. When the carbide tip on the end of the shank hits a rock, a heavy shock load is transmitted which can sheer the mounting bolts.

A further problem is that the weight of the thick pocket is gradually reduced as a result of abrasion of the pocket caused by the friction of the pocket against the stump. After time, one or more of these worn pockets may need to be replaced. The new pockets will be heavier which can easily cause the wheel to become unbalanced, causing severe vibration problems.

Yet another problem with the currently used pockets is caused by the carbide tip being offset from the mounting portion of the pocket in a radial direction with respect to the axis of rotation. Thus, during a stump-cutting operation, the pockets situated near the top of the stump, i.e., the pockets mounted closest to the center of the wheel, will not have a path cleared for them in the stump surface as the wheel is advancing toward the stump in a direction parallel to axis of rotation (i.e., direction C in FIG. 1). That can prevent the wheel from advanced farther into the stump.

Another problem with the currently used pockets is that the operator must loosen or remove both bolts to replace each of the cutting teeth, which is time consuming.

A further problem with currently used pockets and tool systems is that all pockets and shanks on one side of the wheel are configured as mirror images of the pockets and cutting teeth on the other side. That is, different pockets and shanks must be used on each side of the wheel, which requires the operator to maintain a large inventory of all the pockets and cutting teeth for field replacement.

SUMMARY OF THE INVENTION

The present invention relates to a cutting apparatus which comprises a cutting wheel, and a plurality of cutting assemblies mounted on the cutting wheel. The cutting wheel is adapted to be driven about a center axis and includes a pair of side surfaces and an outer peripheral surface interconnecting the side surfaces. The cutting assemblies are mounted in generally circumferentially spaced relationship. Each cutting assembly comprises first and second pockets, a pair of cutting teeth, and a pair of fasteners. The first and second pockets are disposed on respective ones of the side surfaces. Each pocket includes a body having a leading end and a trailing end with reference to a direction of rotation of the cutting wheel. A leading through-hole and a trailing through-hole extend through the pocket. The leading end trailing through-holes of each pocket are aligned with respective leading end trailing through-holes of the other pocket and are aligned with respective mounting holes extending through the cutting wheel. Each of the cutting teeth includes a shank having first and second ends. The first end has an enlarged head with a hard cutting tip disposed thereon. One of the cutting teeth extends through the aligned leading through-holes of the first and second pockets, and the other cutting tooth extends through the aligned trailing through-holes of the first and the second pockets. The cutting teeth extend in mutually opposite directions, wherein the cutting elements are disposed at respective side surfaces of the cutting wheel. Each tooth is mounted against rotation relative to its respective pocket. The fasteners are attached to respective ones of the cutting teeth adjacent the second ends thereof. The enlarged head and the fastener of each tooth cooperate to clamp both of the first and second pockets against respective side surfaces of the cutting wheel.

The invention also relates to the pocket, per se. That is, the pocket comprises a metal body having first and second sides and first and second through-holes extending through the body from the first side to the second side. The first through-hole is of circular cross-section and has a counter bore formed in the first side of the body. The second through-hole is of non-circular cross-section whose shortest dimension is no shorter than a diameter of the first through-hole. The second through-hole has a recess formed in the first side of the body.

The invention also relates to a stump cutter tooth adapted for use on a rotary stump-cutting wheel. The tooth comprises a shank which defines an axis and has first and second axially spaced ends. An external screw thread is disposed at the first end, and a seat is disposed at the second end. A cutting insert is brazed in the seat and is formed of a harder material than the shank. The second end further includes an enlargement disposed axially inwardly of the seat. The enlargement is of larger cross section than the shank and has a portion of non-circular cross section.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF A PREFERRED EMBODIMENT OF THE INVENTION

Figure 1:
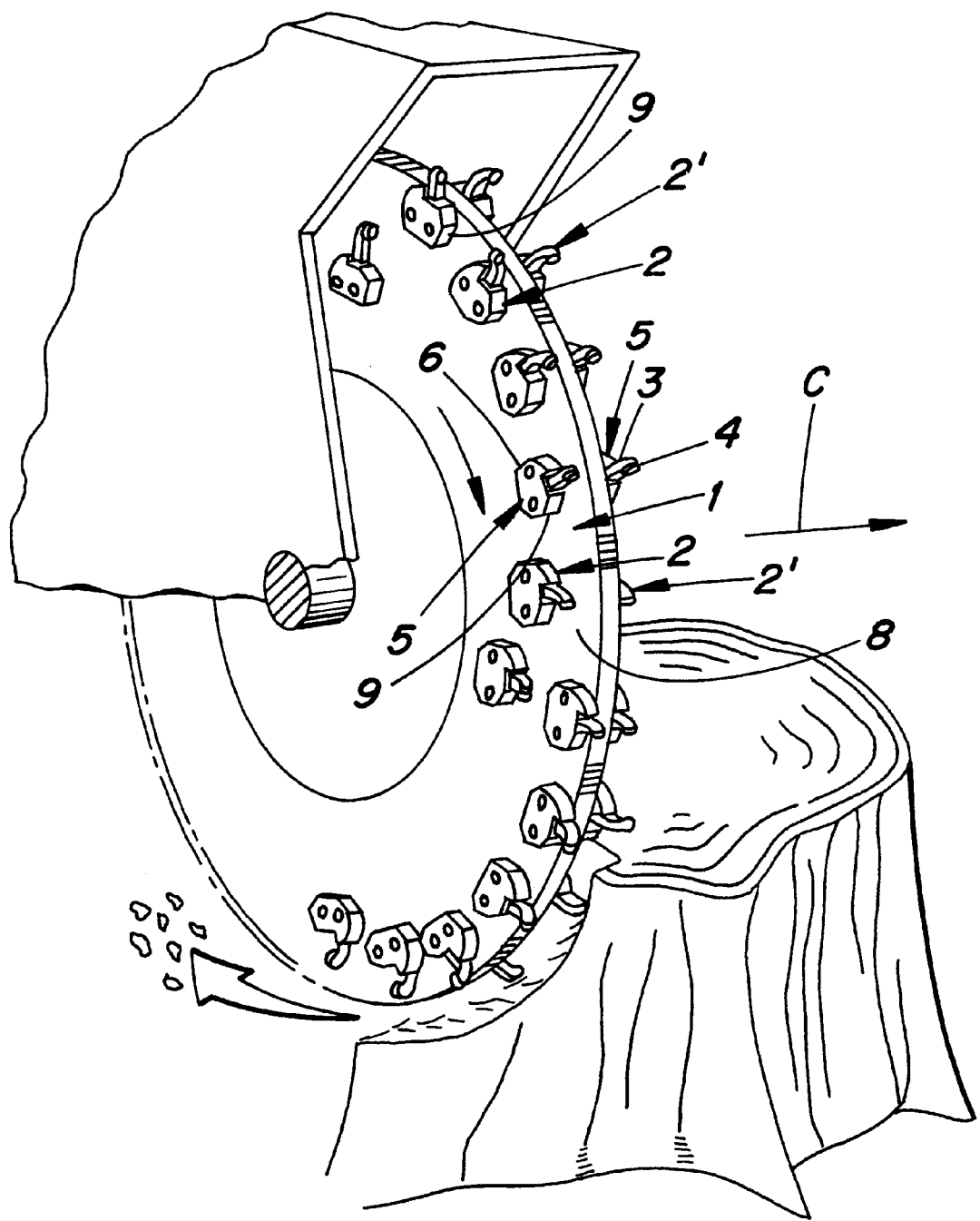
FIG. 1 is a perspective view of a stump cutting tool according to the prior art.
Figure 2:
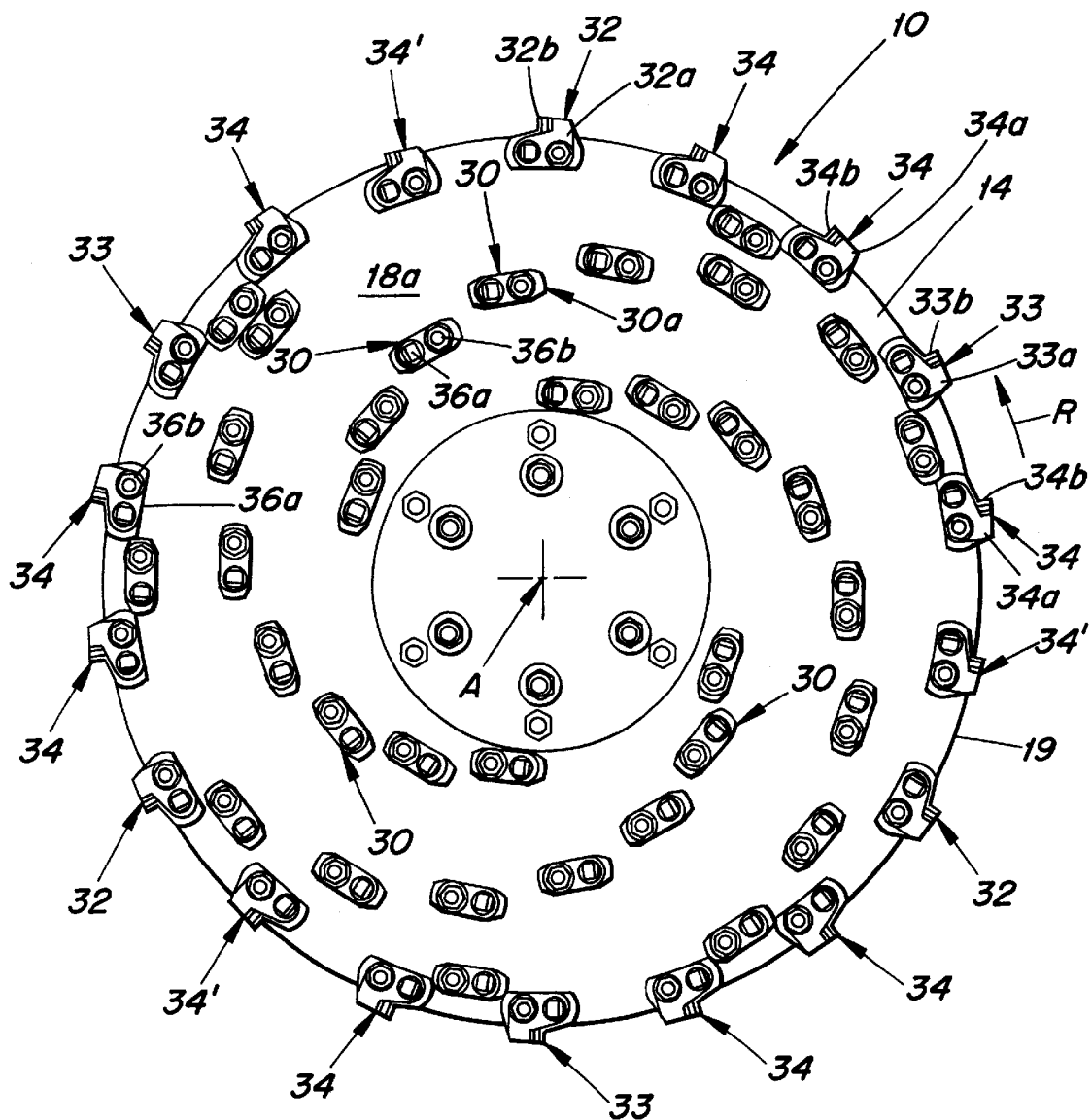
FIG. 2 is a side elevational view of a cutting tool according to the present invention.
Figure 2A:
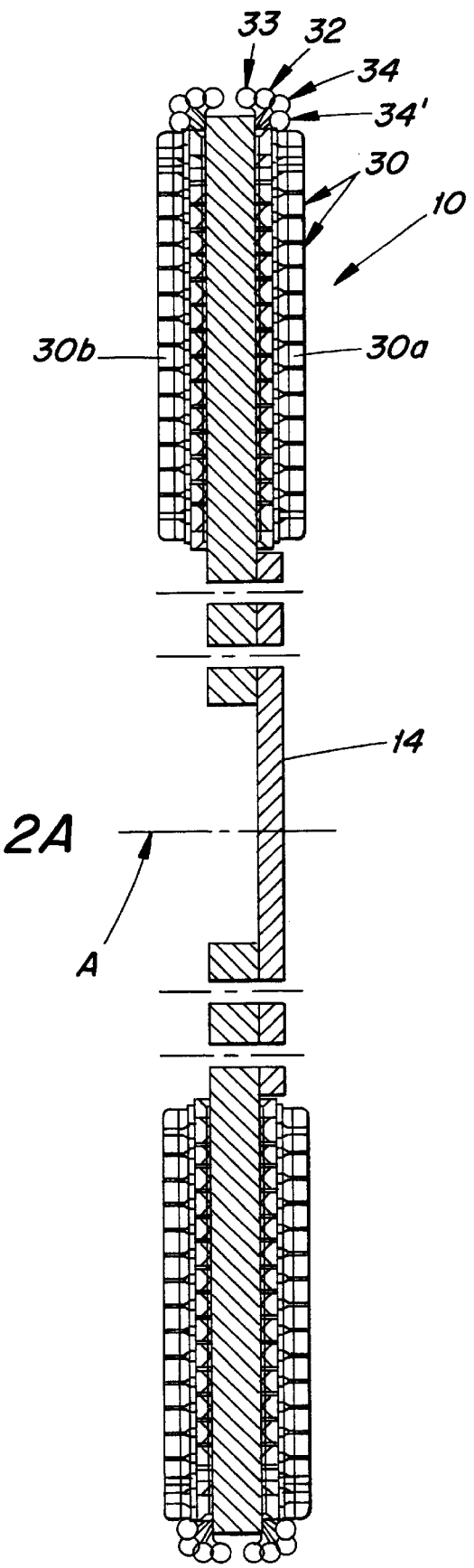
FIG. 2A is a sectional view taken through FIG. 2.
Figure 3:
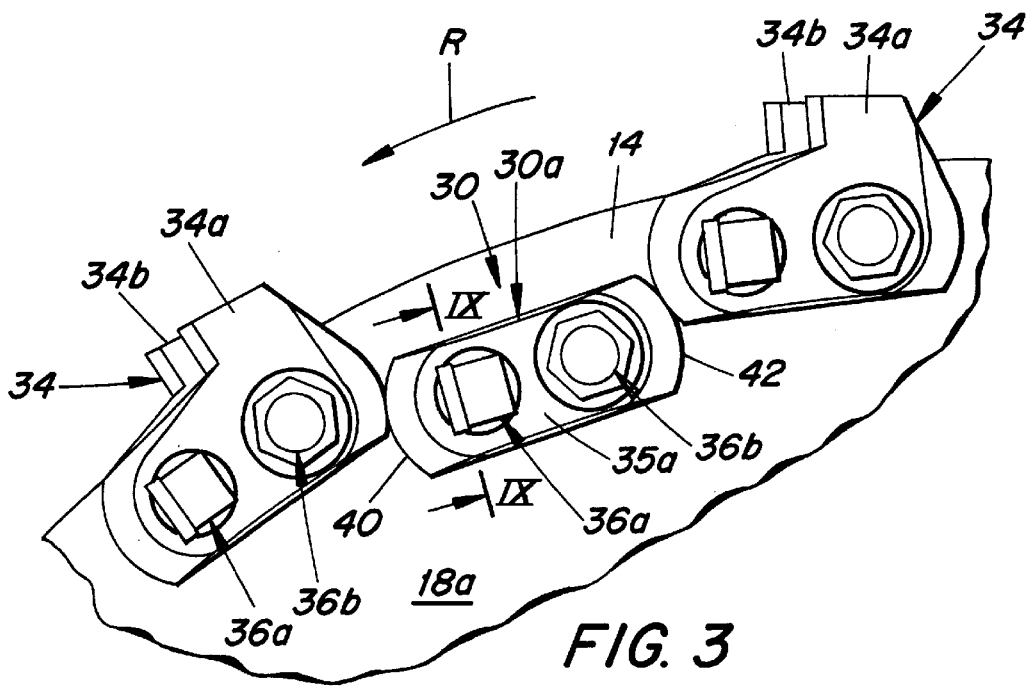
FIG. 3 is an enlarged fragmentary view of FIG. 2.

Depicted in FIG. 2 is a tree stump cutting tool 10 which, like the tool of FIG. 1, is adapted to be connected to a mobile vehicle. The tool 10 includes a cutting wheel 14 adapted for rotation about a horizontal center axis. The cutting wheel includes a pair of side surfaces 18a, 18b (see FIG. 9) and a cylindrical outer peripheral surface 19 interconnecting the side surfaces. The wheel is adapted to be bolted to a rotary drive mechanism, not shown, for rotation about a center axis of rotation A.

Mounted on the cutting wheel are cutting assemblies. There are two basic types of cutting assemblies, namely radially inner cutting assemblies and radially outer cutting assemblies. The radially inner cutting assemblies are identical to each other and designated by the numeral 30. There are three types of radially outer cutting assemblies 32, 33, 34, as will be explained.

The radially inner cutting assemblies 30 preferably form a plurality of generally helically extending groups of cutting assemblies, whereas the radially outer cutting assemblies 32, 33, 34 extend in circumferentially spaced relationship around the outer peripheral surface (see FIG. 2).

Figure 10:
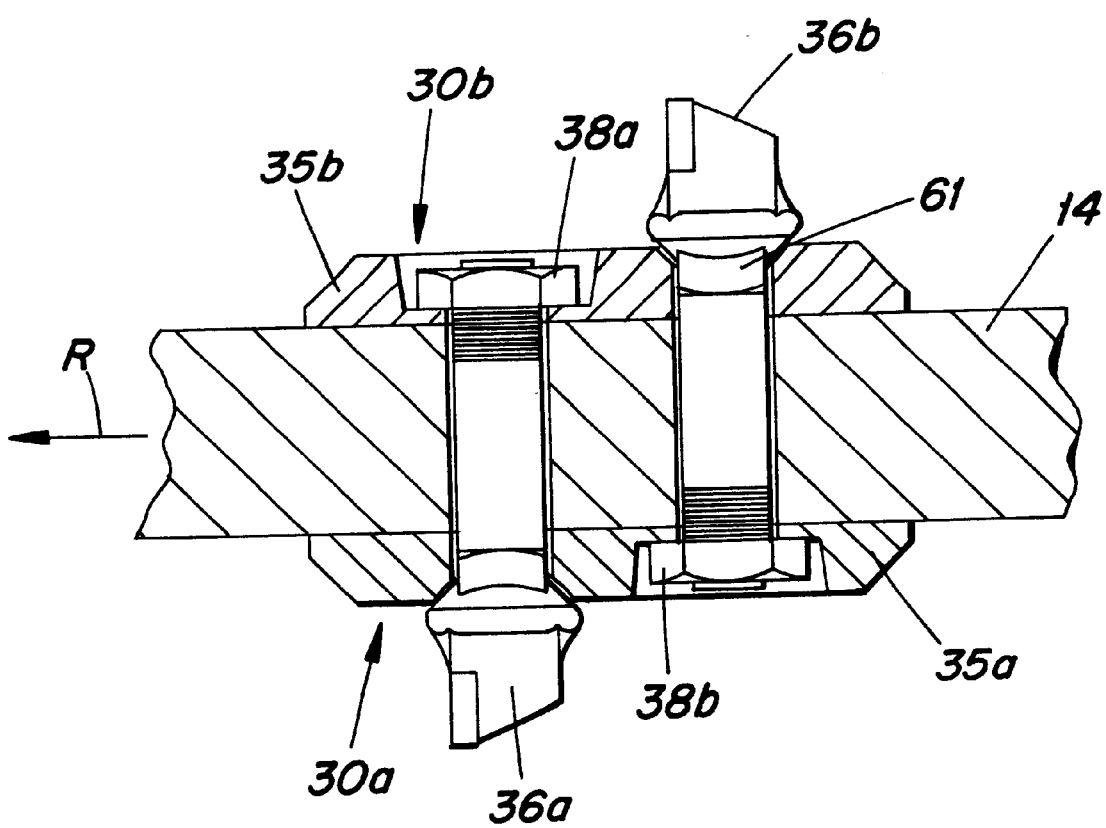
FIG. 10 is a sectional view taken along the line X—X of FIG. 9.
Figure 11:
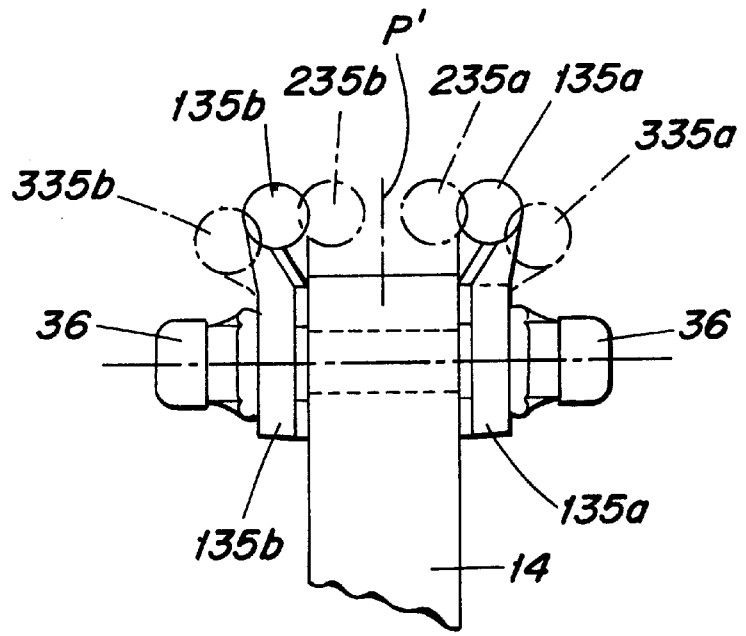
FIG. 11 is a fragmentary view of an outer portion of the cutting tool depicting leading cutting assemblies according to the present invention, with alternative pockets shown in phantom.

Each radially inner cutting assembly 30 is spaced radially inwardly of the outer peripheral surface 19 and comprises a pair of identical cutting units 30a, 30b disposed on respective ones of the side surfaces 18a, 18b (see FIG. 10).

Figure 9:
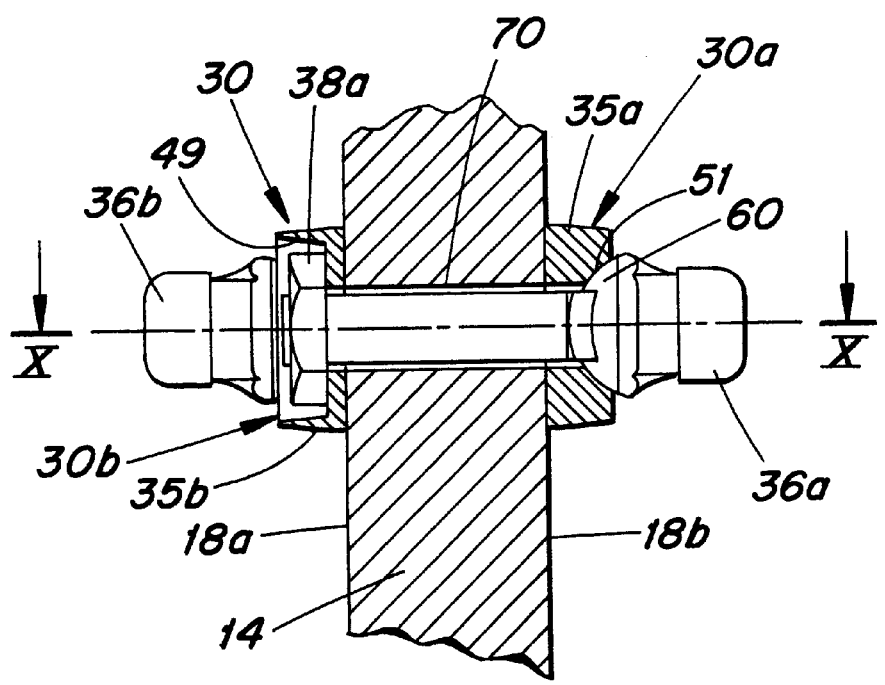
FIG. 9 is sectional view taken along the line IX—IX of FIG. 3.

Each of the cutting units 30a, 30b comprises a pocket 35a or 35b, a cutting tooth 36a or 36b, and a fastener in the form of a nut 38a or 38b (see FIGS. 9, 10). For example, the cutting unit 30b includes a pocket 35b, a cutting tooth 36b, and a nut 38b. Likewise, the cutting unit 30a includes a pocket 35a, a cutting tooth 36a, and a nut 38a. As will become apparent, each of the cutting teeth 36a, 36b passes through both of the pockets 35a, 35b; and the nuts 38a, 38b serve to secure the respective teeth 36a, 36b to the pockets, as well as to secure the two pockets to the wheel 14.

Figure 4:
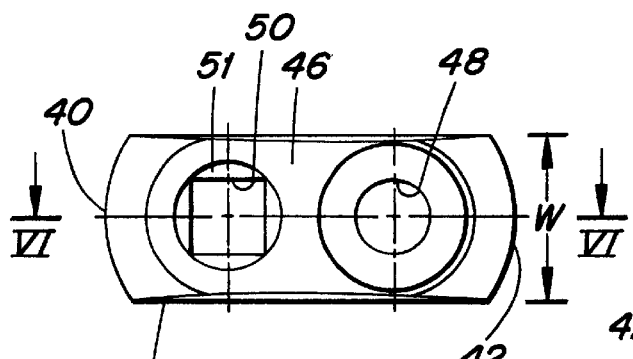
FIG. 4 is a side elevational view of an external side of a pocket according to the present invention.
Figure 5:
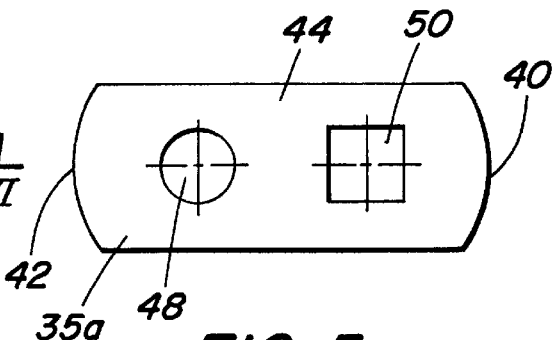
FIG. 5 is a side elevational view of an inner side of the pocket shown in FIG. 4.
Figure 6:
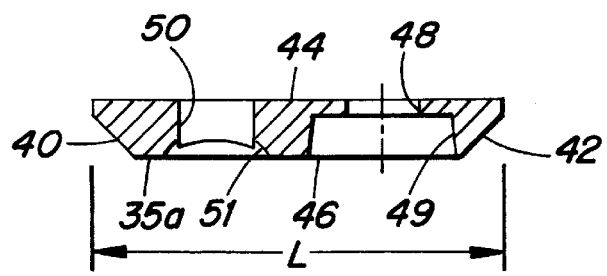
FIG. 6 is a sectional view taken along the line VI—VI of FIG. 4.

In the following description, the tooth 36a and the pocket 35a will be described; they are of identical configuration to the tooth 36b and the pocket 35b, respectively. The pockets are formed of hardened steel. Referring to FIGS. 4–6, it can be seen that the pocket 35a is of elongated shape, including leading and trailing end surfaces 40, 42 considered with reference to the direction of rotation R of the cutting wheel. Those leading and trailing end surfaces are beveled (see FIG. 6) and extend from an inner base surface 44 to an outer surface 46. A width W of the pocket measured in a radial direction with reference to the center of the wheel is substantially shorter than a length L of the pocket measured in a tangential direction of the wheel. Extending through the pocket 35a from the outer surface 46 to the base surface 44 are two through-holes 48, 50. The through-hole 48 has a circular cross section, whereas the through-hole 50 is non-circular (e.g., square) in cross-section and has a sunken recess 51 at its end located at the outer surface 46. The recess has a generally spherical shape.

Although the pockets 35a, 35b are of identical construction, the pocket 35a disposed on the side 18a of the wheel is reversed with respect to the pocket 35b disposed on the other side 18b. More particularly, the pocket 35a is arranged such that the circular through-hole 48 thereof is disposed adjacent a trailing end of the pocket with reference to the direction of wheel rotation R, whereas the pocket 35b is arranged such that the square through-hole 50 thereof is disposed at the leading end of the pocket 35b.

Figures 7, 8:
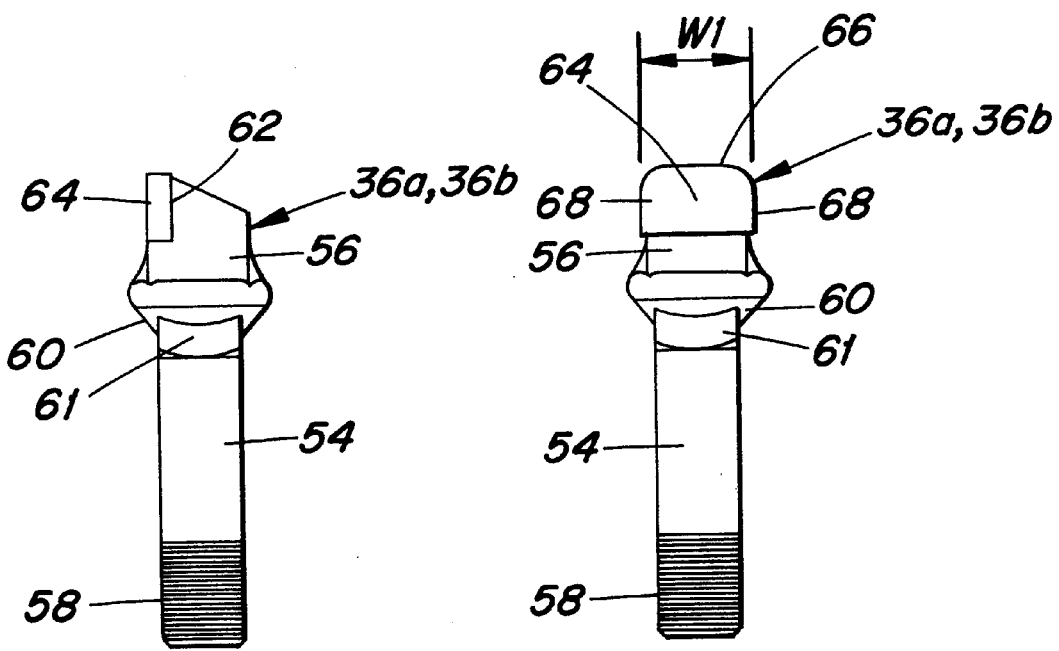
FIG. 7 is a side elevational view of a cutting tooth according to the present invention.
FIG. 8 is a side elevational view of the cutting tooth of FIG. 7 offset by 90° relative to FIG. 7.

Each cutting tooth 36a, 36b includes a shank 54 of circular cross section and an enlarged head 56 disposed at one axial end of the shank (see FIGS. 7, 8). The other axial end of the shank has an external screw thread 58. The shank is formed of hardened steel, and a portion 60 of the head 56 which faces toward the screw thread 58 has a shape corresponding to that of the sunken recess 51 of the through-hole 50 (e.g., spherical). However, it is necessary that the cutting tooth 36a be incapable of rotation relative to the pocket. Accordingly, a portion 61 of the head 56 disposed closest to the screw thread 58 has a non-circular cross section corresponding to the cross-sectional shape of the through-hole 50 (e.g., square). The portion 61 fits into the through-hole 50 for preventing the cutting tooth 36a from turning relative to the pocket. When installing the cutting tooth, the inability of the cutting tooth to rotate relative to the pocket enables an operator to perform the installation with one hand, using a single wrench.

The head 56 has a seat 62 in which is brazed a cutting tip 64 formed of a hard material, such as cemented carbide (e.g., tungsten carbide which is harder than the shank 54). The cutting tip 64 is shaped generally as one-half of a rectangle, wherein the cuffing tip 64 includes a main cutting edge portion 66 and a pair of side cutting edge portions 68. The main cutting edge portion 66 extends perpendicular to a longitudinal axis of the shank 54, and the side edge portions 68 extend parallel to such axis. A length W1 of the portion 66 is preferably not less than 50% of the width W of the pocket.

To mount each of the cutting assemblies 30 on the cutting wheel, it is necessary that the cutting wheel be provided with two mounting holes 70 extending through the wheel parallel to the axis 16, and oriented to be aligned with respective ones of the through-holes 48, 50 of the pockets 35a and 35b. The tooth 36b is inserted through: the square through-hole 50 of the pocket 35b, one of the holes 70, and the circular through-hole 48 of the pocket 35a, and is secured by the nut 38b, which is received in a counter-bore 49 of the circular through-hole 48 of the pocket 35a, as shown in FIG. 9. The square portion 61 of the tooth 36b is seated in the square through-hole 50 of the pocket 35b, to prevent the tooth 36b from turning relative to the pocket and relative to the wheel 14.

Likewise, the tooth 36a is inserted through: the square throughhole of the pocket 35a, another of the holes 70, and the circular throughhole of the pocket 35b and is secured by a nut 38a. The square portion of the enlargement of the tooth 36a is seated in the square through-hole 50 of the pocket 35a, to prevent the tooth 36a from rotating relative to the wheel 14.

It will be appreciated that the enlarged head and the nut of each tooth 36a, 36b cooperate to clamp both of the pockets 35a, 35b against respective side surfaces of the wheel 14.

There are currently in use many conventional stump cutters whose cutting wheel has pairs of holes corresponding to the holes 70 for receiving bolts that secure tooth holders to the cutting wheel. It would be possible to retrofit such cutting wheels with cutting assemblies 30 according to the present invention, wherein the teeth 36a, 36b of the present invention would be inserted through the existing holes of the currently-used cutting wheels.

It will be appreciated that the pockets are relatively thin (i.e., they have small dimensions perpendicular to the plane of the wheel 14), making it easier for the cutting tooth to cut away enough of the workpiece (e.g., tree stump) to permit the pockets to pass.

Since the teeth 36a, 36b pass perpendicularly through the wheel, the cutting elements can extend a distance from the respective side of the wheel to facilitate the passage of chips between the wheel and a side of the stump being ground. Also, the teeth can withstand a considerable force without being sheared off, as compared to teeth that extend parallel to, rather than perpendicular to, the wheel.

The teeth and their fasteners serve to attach the pockets to the wheel, eliminating the need for separate fasteners. Also, the teeth can be separately removed for replacement.

The fact that the leading ends of each pocket are short, thin, and tapered, means that less of the pocket will be exposed to contact with rocks, debris, etc. and thus will reduce fatigue of the pockets, as well as frictional resistance to rotation of the wheel. Also, since the pockets are of relatively small volume, the selective replacement of pockets as they become worn will have less of an adverse influence on wheel balance than the large pockets of the prior art.

The pockets 35a, on the side 18a of the wheel are identical to one another and to their counterparts 35b on the other side 18b, so the number of different pockets that need to be kept in inventory is reduced.

The engagement of the non-circular portion 61 of the enlarged head 56 of each cutting tooth within the non-circular through-hole 50 in the pocket prevents rotation of the cutting tooth relative to the pocket not only during a cutting operation, but also during insertion and removal of the fastening nut, so only one wrench is needed by the operator to insert/remove the nut.

Since the cutting teeth 36a, 36b project out of their respective pockets in directions parallel to the axis of rotation A, each tooth will cut a path for its respective pocket while the wheel is being moved against a stump in a direction parallel to the axis A (i.e., in the direction C of FIG. 1). That will enable the wheel to continuously advance in that direction.

Figure 12:
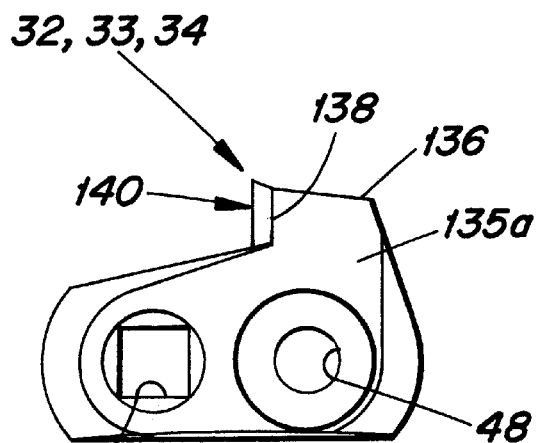
FIG. 12 is a side elevational view of the pocket depicted in FIG. 11.
Figure 13:
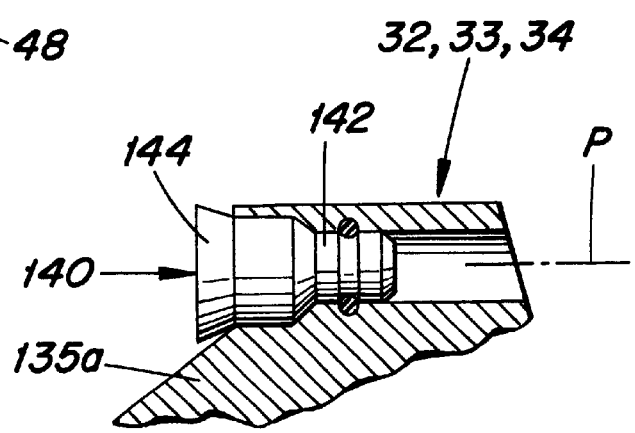
FIG. 13 is a fragmentary sectional view through the pocket of FIG. 12.
Figures 14A, 14B:
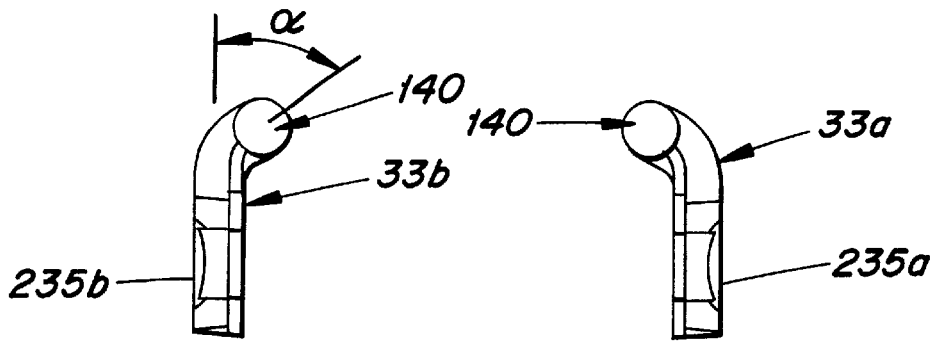
FIG. 14A is a front elevational view of a first type of pocket having an inwardly angled cutting element.
FIG. 14B is a front elevational view of a pocket having an inwardly angled cutting element and which is to be used in combination with the pocket of FIG. 14A.
Figures 15A, 15B:
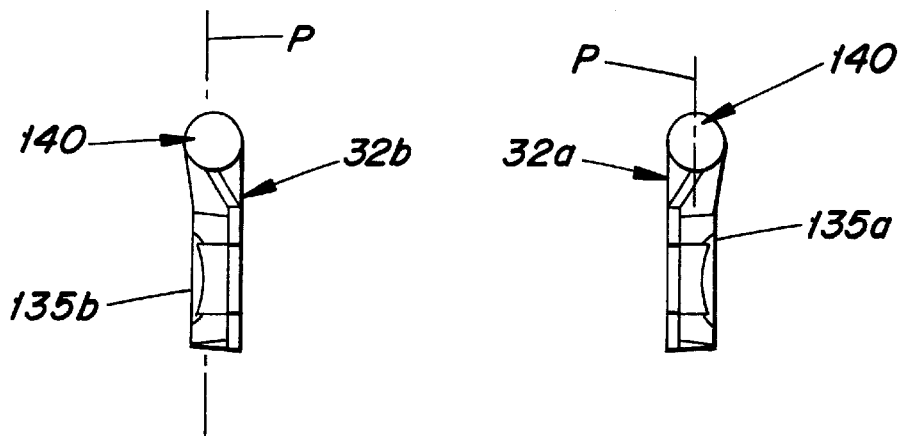
FIG. 15A is a front elevational view of a pocket having a coplanar cutting element.
FIG. 15B is a front elevational view of a pocket having a coplanar cutting element in which is to be used in combination with the pocket of FIG. 15A.
Figures 16A, 16B:
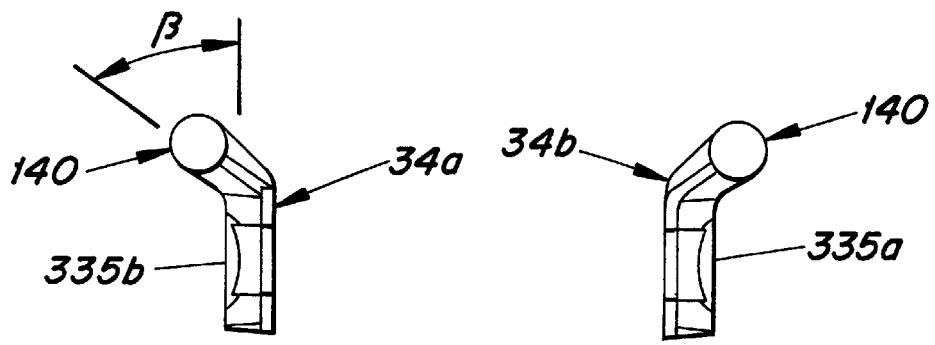
FIG. 16A is a front elevational view of a pocket having an outwardly inclined cutting element.
FIG. 16B is a front elevational view of a pocket having an outwardly inclined cutting element in which is to be used in combination with the pocket of FIG. 16A.

Thus far, the cutting assemblies that have been described are those which only cut at locations located radially inwardly of the outer peripheral surface 19 of the wheel 14, i.e., they constitute inner cutting assemblies. On the other hand, the outer cutting assemblies 32, 33, 34 not only cut at locations radially inwardly of the outer peripheral surface 19, but also cut at locations radially outwardly of the surface 19, to enable the cutting wheel to cut through a stump in a direction perpendicularly of the axis A. Each outer cutting assembly 32 includes two units 32a, 32b disposed at respective sides of the wheel; each assembly 33 includes two units 33a, 33b disposed at respective sides of the wheel 14; each outer assembly 34 includes two units 34a, 34b disposed at respective sides of the wheel. Each outer cutting assembly 32, 33, 34 is partially similar to the inner cutting assemblies 30 in that each outer assembly includes two pockets 135a, 135b through which two cutting teeth 36a, 36b project and are secured by respective nuts (see FIGS. 10, 12). The cutting teeth 36a, 36b cut at locations radially inwardly of the outer peripheral surface 19. The pockets 135a, 135b of the outer cutting assemblies differ from the pockets 35a, 35b of the inner cutting assemblies 30 in that each of the outer pockets 135a, 135b includes a generally radially outwardly projecting integral leg 136 that forms a forwardly facing seat 138 in which a cylindrical cutting tooth 140 is mounted (see FIG. 12). That tooth 140 is similar to the bit disclosed in U.S. Pat. No. 5,135,035, in that the cutting tooth 140 includes a shaft 142 and a hard cutting tip 144 fixed on a front end of the shaft 142. The shaft 142 is mounted for rotation relative to the leg 136 about a longitudinal center axis P of the shaft extending generally in the direction of rotation of the wheel 14 in the manner disclosed in U.S. Pat. No. 5,135,035, the disclosure of which is incorporated by reference herein. By enabling the shaft 142 and its tip 144 to freely rotate, wearing of the tip occurs more uniformly.

Due to the presence of the leg 136, it is not possible for the pockets 135a, 135b to be interchangeable between respective sides of the wheel 14 as in the case of the earlier described pockets 35a, 35b. Rather, a number of differently configured pockets are mounted on the wheel. Thus, as shown in FIGS. 14A through 16B, six such pockets 135a, 135b, 235a, 235b, 335a, and 335b are depicted. The pockets 135a, 235a, 335a are for use on one side of the wheel, whereas the pockets 135b, 235b, 335b are for use on the opposite side of the wheel. The pockets 135a and 135b have their legs extending radially. In the pockets 235a, 235b the legs are angled, e.g., by an angle α (preferably 40°), toward a center plane P' of the wheel 14 so that the cutting tip overlies the outer peripheral surface 19. In the pockets 335a, 335b, the legs are angled in an opposite direction, i.e., away from the center plane by an angle β (preferably 45°).

The outer cutting assemblies 32 employ the pockets 135a, 135b having radial legs; the cutting assemblies 33 employ the pockets 235a, 235b having inwardly angled legs; the cutting assemblies 34 employ the pockets 335a, 335b having outwardly angled legs. Some of the cutting assemblies, 34' which employ the pockets 335a, 335b, are mounted slightly more radially inwardly than the other outer assemblies 32, 33, 34 so that the tips 144 of the assemblies 34' cut out portions of the stump situated between the teeth 140 of the assemblies 32, 33, 34 and the teeth 36a, 36b of those assemblies 32, 33, 34.

It will be appreciated that when the cutting wheel 14 is advanced horizontally toward a stump, the cuffing assemblies 30, 33, 34, 34' will cut a swath through the stump. Then, by moving the wheel 14 forwardly and backwardly with the cutting tips 64 located on the side of the wheel in cutting relationship with one side of the swath, that swath side will be disintegrated. Then, the cutting tips 64 located on the other side of the wheel will be brought into engagement with the opposite side of the swath to disintegrate that swath side. Eventually, the entire stump will be disintegrated.

It will also be appreciated that in accordance with the invention, the number of components of the cutting assemblies is minimized, since the cutting teeth themselves function as bolts for securing the pockets and the cutting tips to the wheel. Instead of fastening the teeth using threaded nuts, there could instead be provided wedges which are inserted through holes formed in the teeth.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A cutting apparatus comprising:
   a cutting wheel adapted to be driven about a center axis, and including a pair of side surfaces and an outer peripheral surface interconnecting the side surfaces; and
   a plurality of cutting assemblies mounted on the cutting wheel, each cutting assembly comprising:
      first and second pockets disposed on respective ones of the side surfaces, each pocket including a body having a leading end and a trailing end with reference to a direction of rotation of the cutting wheel, and a leading through-hole and a trailing through-hole extending through the pocket, the leading and trailing through-holes of each pocket being aligned with respective leading and trailing through-holes of the other pocket and aligned with respective mounting holes extending through the cutting wheel;
      a pair of cutting teeth, each tooth including a shank having first and second ends, an enlarged head having a hard cutting tip disposed at the first end, one of the cutting teeth extending through the aligned leading through-holes of the first and second pockets, and the other cutting tooth extending through the aligned trailing through-holes of the first and second pockets, the cutting teeth extending in mutually opposite directions wherein the cutting elements are disposed at respective side surfaces of the cutting wheel and situated radially inwardly of the outer peripheral surface, each tooth being mounted against rotation relative to its respective pocket; and
      fasteners attached to respective ones of the cutting teeth adjacent the second ends thereof, wherein the enlarged head and the fastener of each tooth cooperate to clamp both of the first and second pockets against respective side surfaces of the cutting wheel.

2. The cutting apparatus according to claim 1 wherein the second end of the shank of each tooth has an external screw thread, each fastener comprising a nut threadedly mounted to the external screw thread.

3. The cutting apparatus according to claim 1 wherein the shanks extend perpendicularly relative to the side surfaces of the cutting wheel.

4. The cutting apparatus according to claim 1 wherein at least some of the cutting assemblies are arranged in groups of cutting assemblies, the cutting assemblies in each group arranged in a generally helical pattern relative to the center axis of the cutting wheel.

5. The cutting apparatus according to claim 4 wherein some of the cutting assemblies constitute radially outer cutting assemblies situated adjacent the outer peripheral surface, each of the first and second pockets of the radially outer cutting assemblies of each group carries an additional hard cutting tip disposed radially outwardly of the outer peripheral surface of the cutting wheel.

6. The cutting apparatus according to claim 5 wherein each of the first and second pockets of the radially outer cutting assemblies includes an integral leg having an outer free end situated radially outwardly of the outer peripheral surface and carrying the additional hard cutting tip.

7. The cutting apparatus according to claim 6 wherein each of the additional hard cutting tips is mounted in the respective leg for rotation about an axis extending generally in the direction of rotation of the cutting wheel.

8. The cutting apparatus according to claim 6 wherein the legs of some of the radially outer cutting assemblies extend axially inwardly toward the outer peripheral surface, so that the additional hard cutting tip overlies the outer peripheral surface.

9. The cutting apparatus according to claim 8 wherein the legs of some of the radially outer cutting assemblies extend axially outwardly away from the outer peripheral surface.

10. The cutting apparatus according to claim 9 wherein the legs of some of the radially outer cutting assemblies extend generally radially outwardly.

11. The cutting apparatus according to claim 1 wherein each pocket has a width measured in a radial direction of the cutting wheel, and a length measured from the leading end to the trailing end, the width being shorter than the length.

12. The cutting apparatus according to claim 1 wherein the enlarged head of each shank has a non-circular portion fitted into a non-circular portion of the respective pocket through-hole to prevent rotation of the shank relative thereto.

13. A cutting apparatus comprising:
   a cutting wheel adapted to be driven about a center axis, and including a pair of side surfaces and an outer peripheral surface interconnecting the side surfaces; and
   a plurality of cutting assemblies mounted on the cutting wheel, each cutting assembly comprising:
      first and second pockets disposed on respective ones of the side surfaces, each pocket including a body having a leading end and a trailing end with reference to a direction of rotation of the cutting wheel, and a leading through-hole and a trailing through-hole extending through the pocket, the leading and trailing through-holes of each pocket being aligned with respective leading and trailing through-holes of the other pocket and aligned with respective mounting holes extending through the cutting wheel;

a pair of cutting teeth, each tooth including a shank having first and second ends, an enlarged head having a hard cutting element disposed at the first end, the second end having an external screw thread, the cutting teeth extending perpendicularly to the cutting wheel in mutually opposite directions, wherein the cutting elements are disposed at respective side surfaces of the cutting wheel and situated radially inwardly of the outer peripheral surface thereof, each tooth being mounted against rotation relative to its respective pocket; and internally threaded nuts attached to the external screw threads of respective ones of the cutting teeth, wherein the enlarged head and the nut of each tooth cooperate to clamp both of the first and second pockets against respective side surfaces of the cutting wheel.

14. The cutting apparatus according to claim 13 wherein each of the first and second pockets of at least a leading one of the cutting assemblies of each group carries an additional hard cutting tip disposed radially outwardly of the outer peripheral surface of the cutting wheel.

15. The cutting apparatus according to claim 14 wherein some of the cutting assemblies constitute radially outer cutting assemblies situated adjacent the outer peripheral surface, each of the first and second pockets of the radially outer cutting assemblies of each group carries an additional hard cutting tip disposed radially outwardly of the outer peripheral surface of the cutting wheel.

16. A pocket for mounting cutting teeth to a cutting wheel, the pocket comprising a metal body having first and second sides and first and second through-holes extending through the body from the first side to the second side, the first through-hole being of circular cross section and having a counterbore formed in the first side of the body, the second through-hole being of non-circular cross-section whose shortest dimension is no shorter than a diameter of the first through-hole, the second through-hole having a sunken recess formed in the first side of the body.

17. The pocket according to claim 16 wherein the body includes first and second ends spaced apart in a direction of spacing of the first and second through-holes, the first and second ends being tapered.

18. The pocket according to claim 17 wherein a dimension of the pocket in a direction between the first and second ends is longer than a dimension of the pocket perpendicular to such direction.

19. A stump cutter tooth adapted for use on a rotary stump-cutting wheel, the tooth comprising a shank defining a longitudinal axis and having first and second axially spaced ends, an external screw thread disposed at the first end, a seat disposed at the second end, a cutting insert brazed in the seat and formed of a harder material than the shank, the second end further including an enlargement disposed axially inwardly of the seat, the enlargement being of larger cross section than the shank, the cross section of a portion of the enlargement being non-circular.

20. The cutter tooth according to claim 19 wherein the cutting insert forms a generally U-shaped cutting edge including a main portion extending substantially perpendicular to the longitudinal axis, and side portions extending substantially parallel to such axis.

* * * * *